(12) United States Patent
Munekata

(10) Patent No.: US 7,828,300 B2
(45) Date of Patent: Nov. 9, 2010

(54) SEALING DEVICE FOR RECIPROCATING SHAFT

(75) Inventor: Shinobu Munekata, Fukushima (JP)

(73) Assignee: NOK Corporation, Tokyo (JP)

( * ) Notice: Subject to any disclaimer, the term of this patent is extended or adjusted under 35 U.S.C. 154(b) by 40 days.

(21) Appl. No.: 11/524,761

(22) Filed: Sep. 21, 2006

(65) Prior Publication Data

US 2008/0073856 A1  Mar. 27, 2008

(51) Int. Cl.
*F16J 15/32* (2006.01)
(52) U.S. Cl. .................. 277/559; 277/436; 277/562; 277/552; 277/566
(58) Field of Classification Search .......... 277/436, 277/559, 562, 563, 552, 553, 566
See application file for complete search history.

(56) References Cited

U.S. PATENT DOCUMENTS

| | | | | |
|---|---|---|---|---|
| RE15,061 | E * | 3/1921 | Cantrell et al. | 277/559 |
| 2,446,380 | A * | 8/1948 | Meyers et al. | 277/559 |
| 3,692,318 | A * | 9/1972 | Day et al. | 277/554 |
| 4,288,083 | A * | 9/1981 | Braconier | 277/559 |
| 4,995,623 | A * | 2/1991 | Wada et al. | 277/552 |
| 5,083,802 | A * | 1/1992 | Shimasaki et al. | 277/560 |
| 5,649,709 | A * | 7/1997 | Munekata et al. | 277/560 |
| 5,664,651 | A * | 9/1997 | Miura et al. | 188/322.17 |
| 6,029,980 | A * | 2/2000 | Downes | 277/552 |
| 6,045,138 | A * | 4/2000 | Kanzaki | 277/562 |
| 6,325,187 | B1 * | 12/2001 | Boucher | 188/322.17 |
| 6,726,211 | B1 * | 4/2004 | Kuroki et al. | 277/353 |
| 2006/0103075 | A1 * | 5/2006 | Zahn | 277/436 |
| 2008/0272558 | A1 * | 11/2008 | Sato et al. | 277/615 |

FOREIGN PATENT DOCUMENTS

JP    2001-173797    6/2001

* cited by examiner

*Primary Examiner*—Alison K Pickard
(74) *Attorney, Agent, or Firm*—Harness, Dickey & Pierce, P.L.C.; Ronald W. Wangerow, Esq.

(57) ABSTRACT

To stabilize frictional force to the reciprocating shaft without affecting sealing ability, a sealing device for a reciprocating shaft comprises a main lip 11, a whole periphery of which slidably and tightly contacts with an outer peripheral surface of a shaft 2 reciprocating in the axial direction; and a frictional lip 13, which extends to the sealed space A side from the main lip 11 and slidably and tightly contacts with the outer peripheral surface of the shaft 2 in the state of permitting circulation of sealed fluid, whereby the frictional force of the frictional lip 13 is not varied by pressure of the sealed fluid, while frictional force of the main lip 11 to the shaft 2 is varied by the pressure, the sliding surface is lubricated with the sealed fluid, and reduction of the frictional force by abrasion can be controlled.

5 Claims, 3 Drawing Sheets

SEALING DEVICE FOR RECIPROCATING SHAFT

BACKGROUND OF THE INVENTION

1. Field of the Invention

The present invention relates to a sealing device for a reciprocating shaft which seals an axial periphery of the reciprocating shaft, for example, a piston rod of a hydraulic shock absorber.

2. Description of the Conventional Art

As a typical prior art of the sealing device for the reciprocating shaft which is used as a means for sealing the axial periphery of the reciprocating shaft such as the piston rod of the hydraulic shock absorber of a vehicle, for example, there is a structure described in Japanese Patent Application Laid Open No. 2001-173797.

FIG. 3 is a half sectional view illustrating a conventional sealing device for a reciprocating shaft of the same kind as the above-described patent document by cutting along a plane passing through an axial center. In FIG. 3, the sealing device 100 is held between a housing, which is not illustrated in drawings, and a reciprocating shaft. The sealing device 100 has a main lip 101 and a dust lip 102 which are integrally formed with a rubber-like elastic material at an inner peripheral part of a flat washer-shaped metal ring 104, and has an outer peripheral seal part 103 which is integrally formed with a rubber-like elastic material at an outer peripheral part of a reinforcement ring 104.

The main lip 101 is directed on the sealing space A side, and an extension spring 105 for compensating tension force is provided in it. By tightly contacting a seal projection 101a at an inner periphery with a proper interference on an outer peripheral face of a reciprocating shaft 200, the main lip 100 prevents to flow out an operating oil, which is sealed in the sealing space A, to an external space B. By tightly contacting an inner peripheral end part 102a with a proper interference on an outer peripheral face of the reciprocating shaft 200, the dust lip 200 prevents to invade a foreign matter into the sealing space A. Further, a supporting projection 101b is formed on the opposite side of the sealing space A (the dust lip 102 side) for controlling deforming of the main lip 101 by the operation oil or the like in the sealing space A. This supporting projection 101b is formed with respect the seal projection 101a of the main lip 101.

However, in the conventional sealing device for a reciprocating shaft 100, since the main lip 101 for sealing the operating oil serves commonly as a frictional force providing force to the reciprocating shaft 200, the required frictional force may not be provided. Further, the frictional force of the main lip 101 with respect to the outer peripheral face of the reciprocating shaft 200 is largely varied also by the fluctuation of the oil pressure in the sealing space A. So, an oil film intervening between the outer peripheral face of the reciprocating shaft 200 and the seal projection 101a of the main lip 101 becomes thin so as to short in lubrication depending on the oil pressure in the sealing space A. Thus, since the seal projection 101a is abraded in an early stage, frictional coefficient is varied. So, it is hard to keep stable frictional force for a long period of time.

SUMMARY OF THE INVENTION

The present invention is made by taking the points mentioned above into consideration, and a technical problem of the present invention is to provide a sealing device for a reciprocating shaft capable of stabilizing frictional force with respect to the reciprocating shaft not depending on sealing ability.

As a means for effectively solving the technical problem mentioned above, a sealing device for a reciprocating shaft according to the invention of claim 1 includes a main lip where a whole periphery of the main lip is slidably and tightly contacted with an outer peripheral face of the shaft reciprocating in the axial direction; and a frictional lip which is extended on the sealing space side from the main lip and slidably and tightly contacted with the outer peripheral face of the shaft in the state of permitting circulation of fluid to be sealed.

In the above-described structure, the whole periphery of the main lip is slidably and tightly contacted with the outer peripheral face of the shaft reciprocating in the axial direction so as to prevent to leak the fluid to be sealed in the sealing space from an axial periphery. On the other hand, the frictional lip compensates frictional force with respect to the shaft. That is, although frictional force of the main lip with respect to the shaft is varied by the pressure of the fluid to be sealed in the sealing space, the frictional lip permits the circulation of the fluid to be sealed. Thus, the frictional force of the frictional lip is not varied by the pressure of the fluid to be sealed, and the sliding face is lubricated with the fluid to be sealed, so that decreasing the frictional force by friction can be controlled. Therefore, the frictional force of the whole sealing device for a reciprocating shaft can be stabilized.

According to the sealing device for a reciprocating shaft according to the invention of claim 1, variation of the frictional force of the main lip is compensated by the frictional lip in which the frictional force is not varied by the pressure of the fluid to be sealed. Thus, the stable frictional force can be kept for a long period of time. Further, by a mode of the frictional force, appropriate frictional force can be set without influencing on the sealing ability of the main lip.

DETAILED DESCRIPTION OF PREFERRED EMBODIMENT

Figure 1:
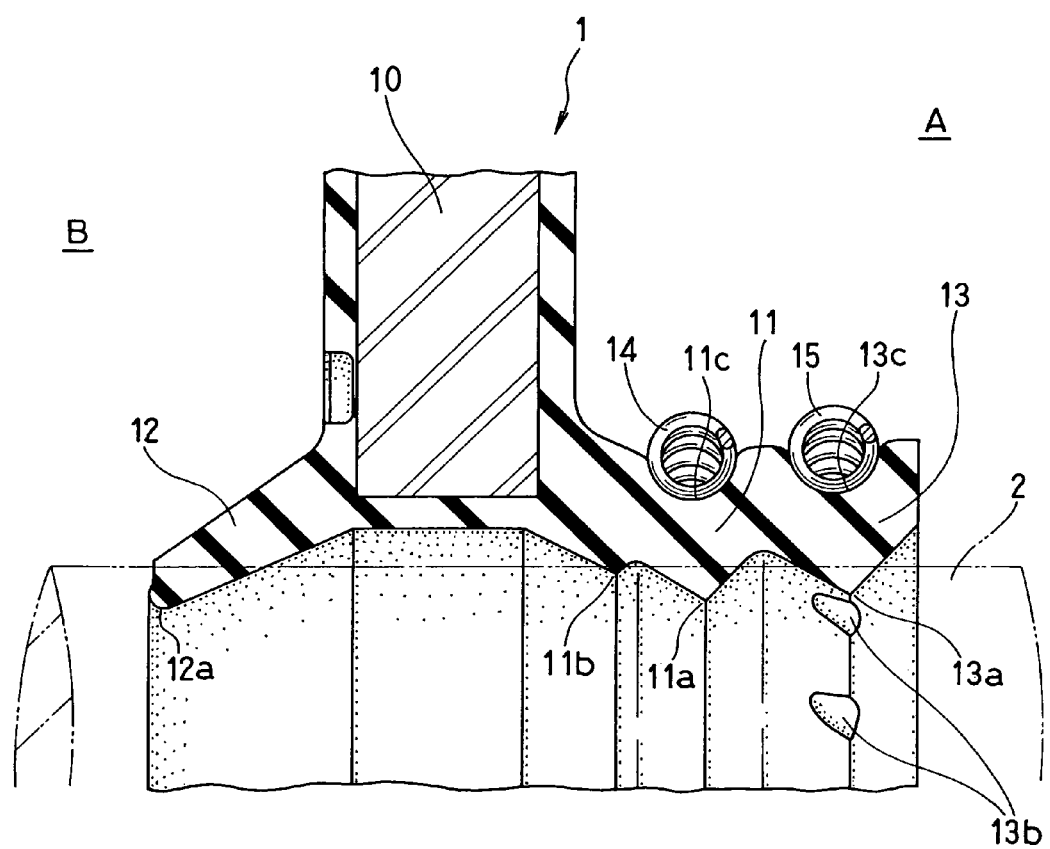
FIG. 1 is a half sectional view illustrating a preferable embodiment of a sealing device for a reciprocating shaft according to the present invention by cutting along a plane passing through an axial center.
Figure 2:
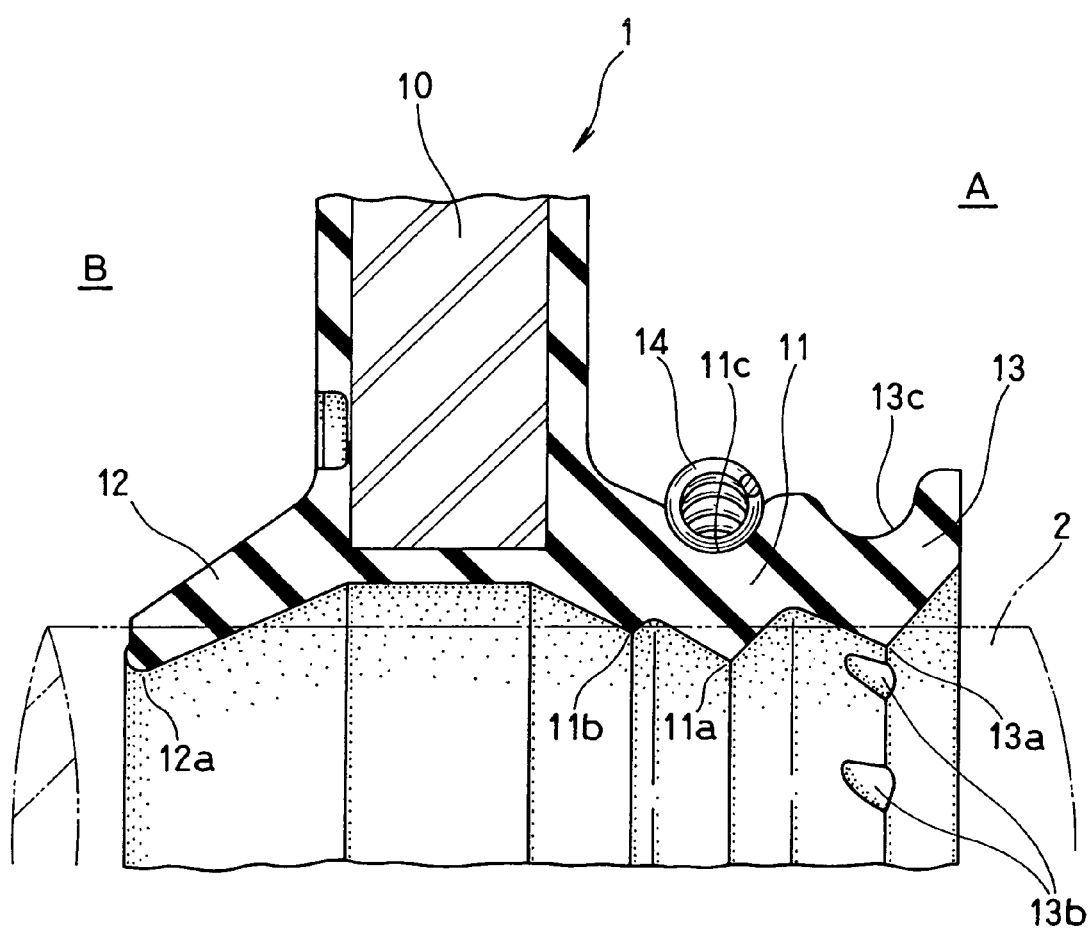
FIG. 2 is a half sectional view illustrating an example, in which an extension spring 15 in FIG. 1 is removed, by cutting along a plane passing through an axial center.
Figure 3:
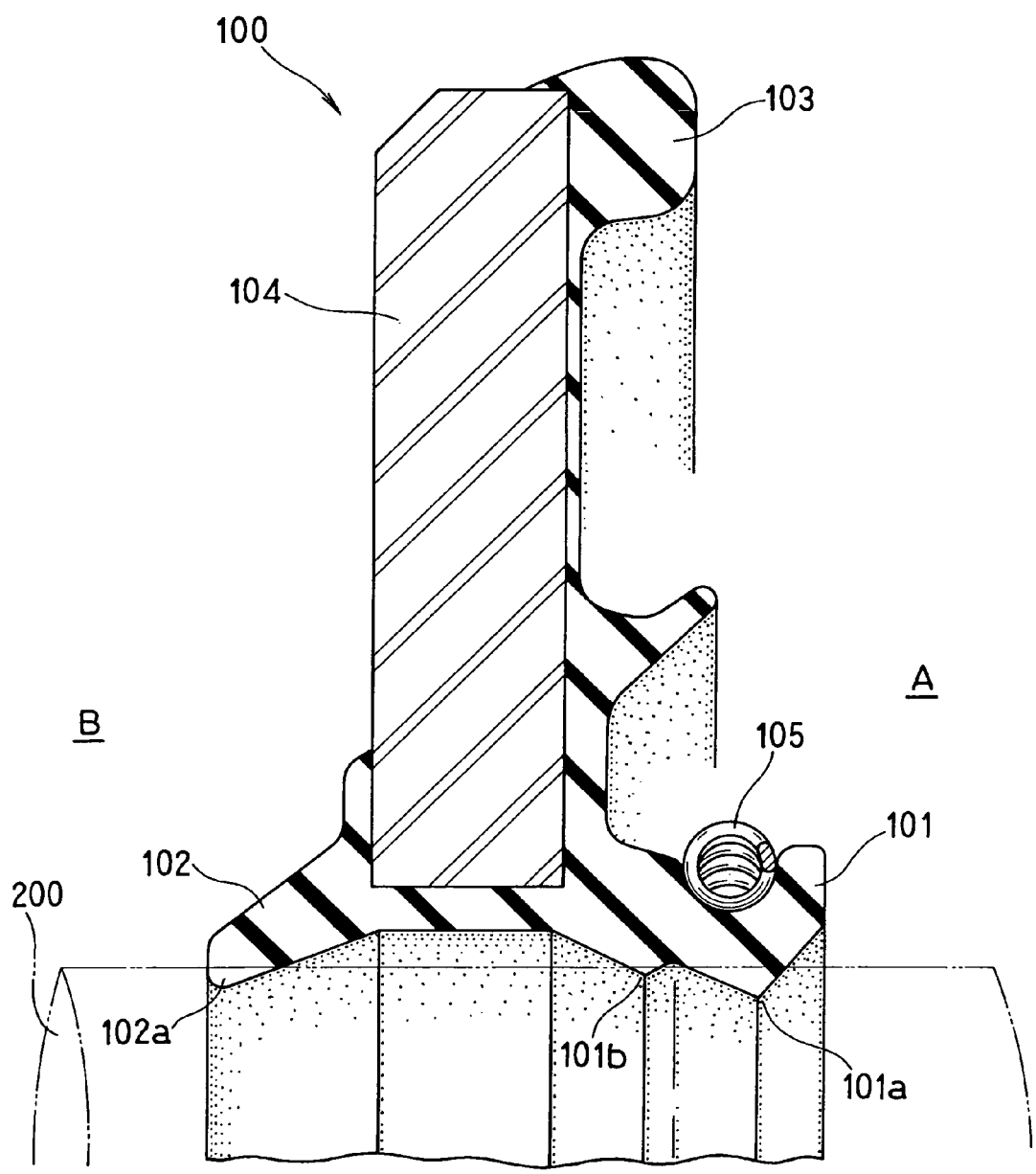
FIG. 3 is a half sectional view illustrating a conventional sealing device for a reciprocating shaft by cutting a plane passing through an axial center.

Hereinafter, a preferable embodiment of the sealing device for a reciprocating shaft of the present invention is described concretely with drawings, and the sealing device is used as a shaft seal means of, for example, a piston rod of a hydraulic shock absorber of a vehicle (a shock absorber). FIG. 1 is a half sectional view illustrating a preferable embodiment of a sealing device for a reciprocating shaft according to the present invention by cutting along a plane passing through an axial center. FIG. 2 is a half sectional view illustrating an example, in which an extension spring 15 in FIG. 1 is removed, by cutting along a plane passing through an axial center. In these drawings, the right side is a sealing space A filled with an operating oil to be sealed, and the left side is an external space B. A reference code 1 is a sealing device according to the present invention, and a reference code 2 is a shaft reciprocating in the axial direction (hereinafter, it is said to as a reciprocating shaft) for example, the above-described piston rod.

In FIG. 1, the sealing device 1 has a flat washer-shaped metal ring 10, which is hermetically fixed at an inner periphery of an end part of a cylindrical housing not illustrated in the drawings; and a main lip 11, a dust lip 12 and a frictional lip 13, which are integrally formed with a rubber-like elastic material, at an inner peripheral part thereof.

The main lip 11 is extended in a conical cylindrical shape so as to have a small diameter on the top end side, and extended toward the sealing space A side from an inner peripheral end part of the metal ring 10. The main lip 11 has a seal projection 11a and a supporting projection 11b at an inner peripheral face thereof. The seal projection 11a is continuously formed in the circumferential direction having a V-shaped cross sectional shape. The supporting projection 11b is positioned more on the metal ring 10 side than the seal projection 11a, and continuously formed in the circumferential direction having a V-shaped cross sectional shape. The maim lip 11 has a groove 11c on an outer peripheral face thereof. The groove 11c is positioned on the outer periphery side of the seal projection 11a, and continuously formed in the circumferential direction. An extension spring 14 is mounted on the groove 11c for compensating tension force of the main lip 11 with respect to the reciprocating shaft 2.

An inner diameter of the supporting projection 11b in the main lip 11 is larger than an inner diameter of the seal projection 11a. That is, an interference of the supporting projection 11b with respect to the reciprocating shaft 2 is smaller than that of the seal projection 11a.

The dust lip 12 is extended toward the opposite side of the main lip 11 (the external space B side) from the inner peripheral end part of the metal ring 10, and extended in a conical cylindrical shape so as to have a small diameter on the top end side. The inner peripheral end part 12a is tightly contacted with the outer peripheral face of the reciprocating shaft 2 with a proper interference.

The frictional lip 13 is extended toward the sealing space A side from the main lip 11, and has a frictional projection 13a and a recessed part 13b, which are alternately formed in the circumferential direction at an inner peripheral face thereof. The frictional projection 13a has a V-shaped cross sectional shape, and can be tightly contacted with the outer peripheral face of the reciprocating shaft 2 with a proper interference. The recessed part 13b is for making the frictional projection 13a to be discontinuous with respect to the circumferential direction. An outer peripheral face of the frictional lip 13 has a groove 13c. The groove 13c is positioned on the outer peripheral face side of the frictional projection 13a and is continuously formed in the circumferential direction. An extension spring 15 is mounted on the groove 13c for compensating tension force of the frictional lip 13 with respect to the reciprocating shaft 2.

The frictional lip 13 does not have a sealing function since the frictional projection 13a is intermittent in the circumferential direction. That is, the frictional lip 13 is slidably and tightly contacted with the outer peripheral face of the reciprocating shaft 2 with a proper interference in the state of permitting circulation of the fluid to be sealed.

As for the sealing device for a reciprocating shaft 1 in FIG. 1 having the above-described structure, the main lip 11 is mounted on an inner periphery of a housing not illustrated in the drawings, so as to be directed on the sealing space A side. Further, the main lip 11, the dust lip 12 and the frictional lip 13 are externally inserted into the outer peripheral face of the reciprocating shaft 2 with proper interferences respectively. Thereby, the sealing device 1 has a mounting state illustrated in FIG. 1. Further, in this state, when the main lip 11 is tightly slid relatively with the outer peripheral face of the reciprocating shaft 2 reciprocating in the axial direction, it can be prevented to flow out the oil to be sealed in the sealing space A to the external space B. Further, when the dust lip 12 is tightly slid relatively with the outer peripheral face of the reciprocating shaft 2, it can be prevented to invade a foreign matter from the external space B to the sealing space A.

In this case, the main lip 11 is deformed by the oil pressure in the sealing space A, which acts on the outer peripheral face thereof, and by the moving direction of the reciprocating shaft 2. However, the deforming is controlled by contacting the supporting projection 11b to the outer peripheral face of the reciprocating shaft 2, where the supporting projection 11b is formed at the main lip 11.

The frictional lip 13 does not have the sealing function in the frictional projection 13a tightly contacted with the reciprocating shaft 2, and permits circulation of the operating oil from the sealing space A at the recessed part 13b. Thus, the friction lip 13 does not prevent to form a lubricating oil film on the sliding part between the seal projection 11a of the main lip 11 and the reciprocating shaft 2. Therefore, the main lip 11 can keep a sufficient lubricating state with respect to the reciprocating shaft 2, and abrasion is controlled.

Further, the main lip 11 and the dust lip 12 generates the frictional force by the sliding on the reciprocating shaft 2, and as for the main lip 11 especially, the frictional force is largely varied by the oil pressure in the sealing space A, where the oil pressure acts on the outer peripheral face of the main lip 11. On the other hand, the frictional lip 13 does not have the sealing function as described above, and permits circulation of the fluid to be sealed in the recessed part 13b. So, the pressure of the operating oil acting on the outer peripheral face of the main lip 11, which is induced at more on the frictional lip 13 side than the seal projection 11a of the main lip 11, is balanced with the pressure of the operating oil invading into the inner periphery of the frictional lip 13, where these pressures are balanced in the diameter direction. Thus, since the pressure of the operating oil does not act-on as the tension force of the frictional lip 13, the frictional force of the frictional lip 13 with respect to moving of the reciprocating shaft 2 in the axial direction is not varied by the pressure of the operating oil. Therefore, the frictional lip 13 compensates the frictional force induced by the main lip 11 and the dust lip 12, and has an operation for relaxing varying of the frictional force of the whole sealing device 1.

Further, the sliding face of the frictional lip 13 with respect to the reciprocating shaft 2 is sufficiently lubricated with the operating oil, so that decreasing of the frictional force by abrasion can be also controlled.

In addition, the sliding face of the frictional lip 13 has the recessed part 13b in which the operating oil is circulated. So, even if the tension force of the frictional lip 13 with respect to the reciprocating shaft 2 is equal to that of the main lip 11, the frictional force is different from that of the main lip 11. Further, the extension spring 15 mounted on the frictional lip 13 is made to have the different tension force from that of the extension spring 14 of the main lip 11, or the frictional lip 13 is not mounted with an extension spring as illustrated in an example of FIG. 2, so that arbitrary frictional force can be set.

What is claimed is:

1. A seal for engaging a shaft, comprising:
   a main seal directed toward a space to be sealed, the main seal including a main lip adapted to be slidably and tightly contacted with the shaft; a frictional lip axially spaced from the main lip in a direction toward the space to be sealed and adapted to have a circumferentially discontinuous contact surface with the shaft, including a plurality of axially extending recesses to permit circulation of fluid to be sealed through said frictional lip and allow a pressure of the fluid on an outer peripheral face of the frictional lip to be balanced by the oil that passes through the recesses toward the main lip, said main lip having a circumferentially continuous contact surface and a smaller inner diameter than said frictional lip; and a support lip axially spaced from the main lip in a direction away from the space to be sealed and adapted to be slidably and tightly contacted with the shaft; and a dust seal directed toward an external space.

2. The seal according to claim 1, further comprising a first spring disposed radially outward from said main lip and a second spring disposed radially outward from said frictional lip.

3. The seal according to claim 2, wherein the dust seal includes a dust lip slidably contacted with an outer peripheral face of the shaft.

4. The seal according to claim 1, wherein said discontinuous contact surface includes at least one recess therein.

5. The seal device of claim 1, wherein said main lip has a smaller inner diameter than that of said frictional lip and said support lip.

* * * * *